United States Patent Office 3,213,262
Patented Oct. 19, 1965

3,213,262
SHIELDED ARC WELDING METHOD AND
APPARATUS
Ferdinand Marchand, Commercy (Meuse), France, assignor to Tréfileries et Ateliers de Commercy, Commercy (Meuse), France
Filed Apr. 20, 1964, Ser. No. 361,093
Claims priority, application France, Feb. 2, 1961,
851,456, Patent 1,287,534
4 Claims. (Cl. 219—130)

This invention relates to welding apparatus and methods.

This application is a continuation-in-part of my prior co-pending application Ser. No. 169,274, filed on Jan. 29, 1962, and entitled: Shielded Arc Welding Method and Apparatus.

Automatic and semi-automatic shielded arc welding apparatus utilizing fusion electrodes are well known. They comprise a source of current and welder and unwinding means wherein a motor feeds wire from a spool through a welding head.

In all known apparatus of this character, a fixed point of operation is defined in a voltage diagram, discussed more fully hereinafter, as a function of currents $U=f(I)$ by selecting prior to the welding operation the proper adjustment of the welder and of the rate of feed of the welding wire, if the motor is of the constant-speed type, or the arc voltage, if the motor has a variable speed responsive to the arc voltage. Therefore, this point of operation is determined arbitrarily before the welding proper and lies in a zone limited by the possibilities of the source of current and of the wire feed motor.

A systematic study of this shielded arc welding process has proved that with a given wire diameter and a given shielding gas the points of operation represented by I (intensity) and U (voltage) in the aforesaid diagram, for which the arc is applicable on a commercial scale (appearance of weld seam, minimum projection, etc.), lie in an elongated zone extending upwards. This zone is called the "correct fusion zone."

It is an object of this invention to provide a shielded arc welding method utilizing a fusion electrode, wherein the rate of feed of the wire constituting the fusion electrode is subordinate to the arc voltage, this method being characterized in that wire-speed to arc-voltage relationship is so determined that the point of operation constantly lies within the correct fusion zone consistent with the diameter of the fusion wire utilized.

This invention is also concerned with an apparatus for carrying out the method broadly set forth hereinabove.

The method and apparatus of this invention are extremely advantageous from a purely commercial point of view. In fact, this apparatus may be operated even by relatively unskilled hands, whereas heretofore this type of welding apparatus has required extended training. In fact, the optimum adjustment of the arc is rather delicate to obtain from a direct visual observation of the arc operation.

In order to afford a clearer understanding of this invention and of the manner in which the same may be carried out in practice, reference will now be made to the accompanying drawings illustrating the invention diagrammatically by way of example and wherein.

Figure 1:
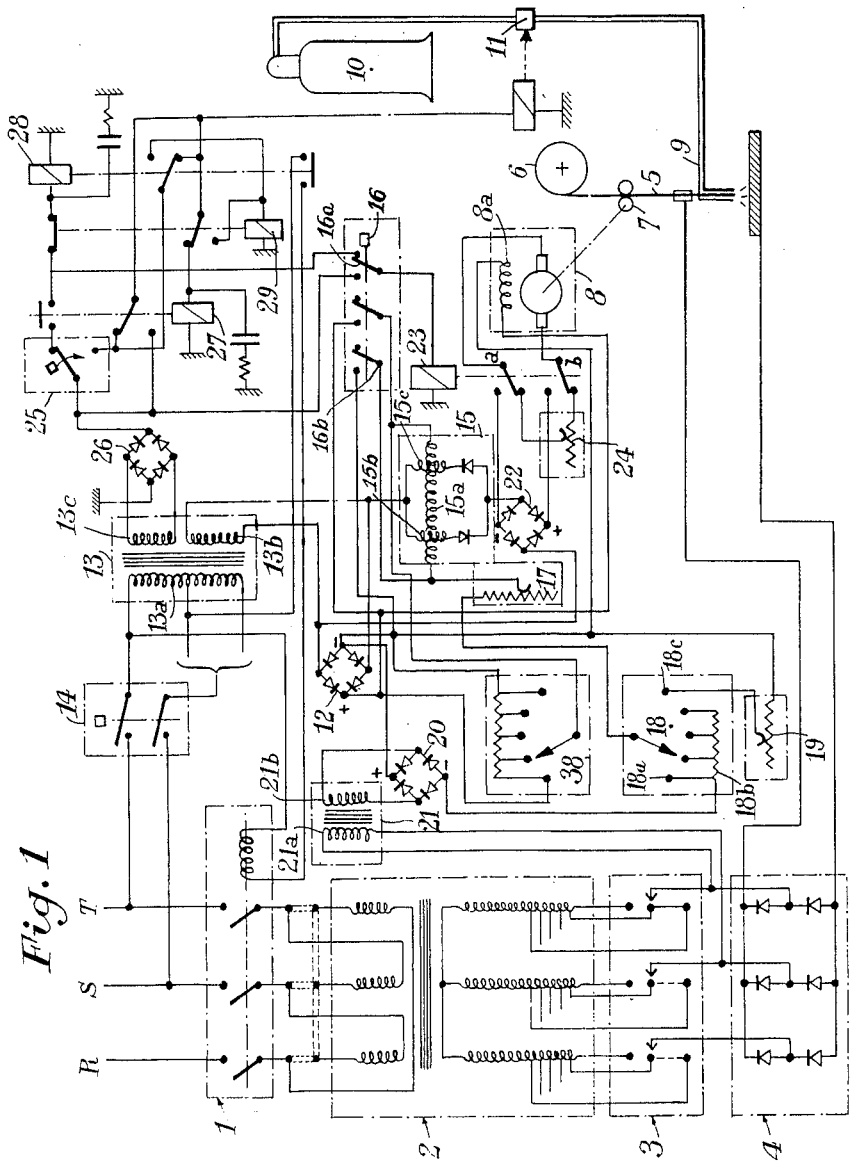
FIGURE 1 is a wiring diagram of the welding apparatus of this invention.

In FIG. 1, a welding apparatus according to this invention is connected to a three-phase supply RST through a main welding switch 1 controlling the supply set of the welder. This supply set comprises a three-phase transformer 2 the secondary windings of which supply current through a switch 3 to a rectifying unit or bridge 4 delivering a direct voltage U at its output terminals, this voltage U being substantially constant as a function of the current intensity I. This type of supply set is preferred due to the great stability of the welding arc obtained therethrough and also because it provides the optimum dynamic characteristics necessary for transferring metal within the arc.

The welding apparatus proper comprises on the other hand an unwinding device for feeding the wire constituting the fusion electrode. The wire 5, more particularly, is paid out from a roll or spool 6 under the control of unwinding members 7 rotatably driven by a motor 8.

The fusion wire 5 is fed through a welding gun 9 receiving arc shielding gas from a compressed-gas bottle 10 through a solenoid-operated valve 11.

The motor 8 for unwinding the wire 5 is a direct-current motor with separate excitation. The excitation winding 8a of motor 8 is connected directly across the positive and negative terminals of a rectifying bridge 12 having its alternating-current input terminals connected to a secondary winding 13b of an auxiliary transformer 13. In the circuit of the primary winding 13a of this transformer are disposed the contacts of an auxiliary switch 14 which connect the primary winding 13a to two phases of the aforesaid RST mains.

The control device of the motor 8 comprises a magnetic amplifier 15 whose control winding 15a is connected between the D.C. output terminals of two rectifying bridges 12 and 20 in series with the adjustable resistances controlled by the switches 18 and 38. The A.C. input terminals of the rectifying bridge 20 are connected to the ends of the secondary winding 21b of an isolating transformer 21.

The primary winding 21a of transformer 21 is connected across the two phases supplying current to the rectifying bridge 4. Thus, it controls the welding voltage. The automatic regulation switch 18 comprises a plurality of contact studs 18a connected to spaced taps on a resistance 18b. Thus, it will determine the value of the automatic correction of the unwinding speed as a function of the arc voltage, according to the diameter of the welding wire utilized.

Figure 3:
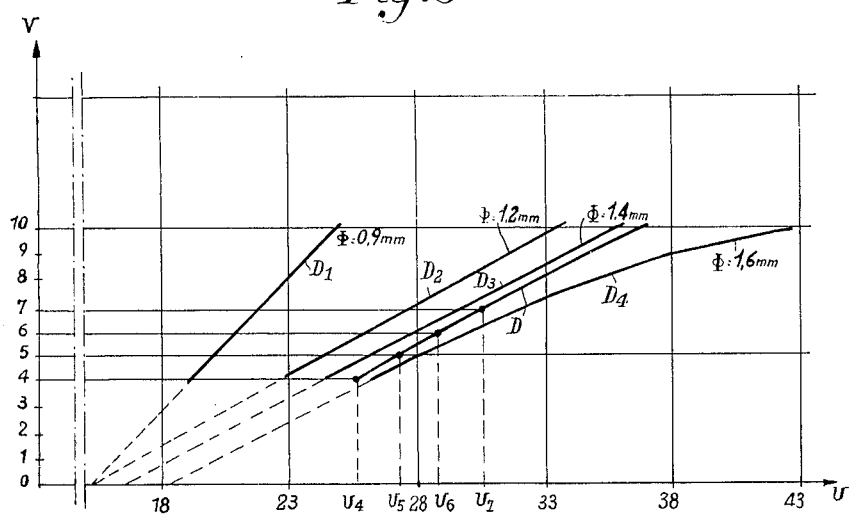
FIGURE 3 is another diagram showing the correction curves obtaining with different diameters of fusion wire.

The switch 38 supplies an adjustable reference voltage which is added to that proportional to the arc voltage controlled by the switch 18, in order that the voltage at the terminals of the control winding 15a shall follow a law of dependence correctly defined below with reference to FIGURE 3.

The control winding 15a of the magnetic amplifier 15 is also connected in series with a potentiometer 17 for the fine adjustment of the unwinding speed in order to cover the complete correct fusion zone or range of the wire utilized.

The rectifying bridge 12 fed from the secondary winding 13b of auxiliary transformer 13 is also connected across the terminals of the control winding 15a of the magnetic amplifier 15 in the following cases:

(1) When the switch 18 is in position 18c. In this case the wire unwinding speed is not regulated by the arc voltage and the motor rotates at a constant speed defined by the potentiometer 19.

(2) When the wire-feed button 16 is depressed. In this alternative case the contact 16a will connect the winding 15a directly across the terminals of the rectifying bridge 12 and contact 16b will energize relay 23. The armature of motor 8 is energized and the latter revolves at its maximum speed. The wire-feed button 16 is used for supplying welding wire to the welding head outside the welding operations proper.

The magnetic amplifier 15 comprises, in addition to the control winding 15a, two output windings 15b and 15c connected in parallel, with associated rectifiers, on the one hand to the secondary winding 13b of auxiliary transformer 13 and, on the other hand, to an input terminal of a rectifying bridge 22.

The rectifying bridge 22 delivers across its positive and negative terminals a voltage which is a function of the arc voltage U when the switch 18 is in one of its two positions 18a, this voltage being fed through contacts a and b of the relay 23 controlling the motor 8 to the armature of this motor. In the inoperative position the contacts a and b of relay 23 connect a resistance 24 in series with the armature to brake the motor 8.

Finally, the apparatus comprises an electromechanical automatic control device consisting essentially of a trigger 25 as conventionally mounted on the welding gun, which is connected to the positive terminal of a rectifying bridge 26 fed from the secondary winding 13c of the auxiliary transformer 13. The electromechanical control device comprises on the other hand relays 27, 28 and 29. Relay 27 is a holding relay, relay 29 a breaking relay and, finally, relay 28 when energized closes the main switch 1.

The welding apparatus according to this invention is capable of maintaining, for a fusion wire of a given diameter, the point of operation as defined by the voltage diagram U in volts as a function of the current intensities I in amperes (which diagram is illustrated by way of example in FIG. 2) within a correct fusion zone A lying inside the range of operation defined by the curves B, B1 and C, C1. Curves B and B1 are respectively the curves of the points of operation obtaining at the maximum and minimum unwinding speeds of the fusion wire. Curves C and C1 designate respectively the maximum and minimum characteristics of the welding set.

Figure 2:
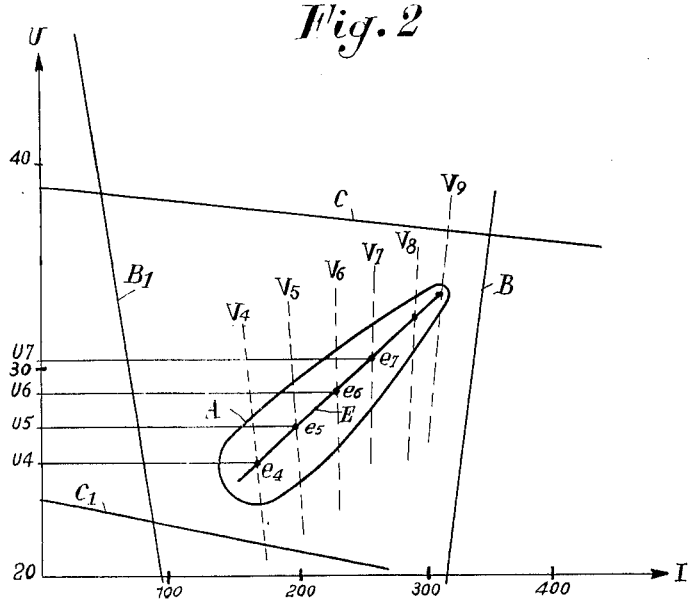
FIGURE 2 is a diagram showing the voltages as a function of current, and showing a curve limiting the correct fusion zone for a fusion wire of given diameter.

In FIG. 2 it will be seen that the correct fusion zone has an elongated configuration extending upwards. This zone is determined through measurements carried out at different values of the unwinding speed V expressed in metres/minute.

The correct fusion zone is determined more accurately by causing the arc voltage U to vary for a constant unwinding speed V. It is then found that, for a given unwinding speed, if the voltage is too high, the wire forming the electrode melts in the shape of large droplets. Fusion takes place irregularly and the arc is unstable. A large number of projections of droplets of the melted metal round the weld bath are found and hence the working conditions are poor.

If for the same unwinding speed in question the arc voltage is reduced below a certain limit, it is similarly found that arc instability arises. There is in fact too much metal supplied by the fusible electrode in relation to the electrical energy available. An "arc waste" phenomena is observed which causes variations in arc length and hence again poor working conditions.

Between the unfavorable working conditions corresponding to too high and too low arc voltages there exists therefore for a given unwinding speed an intermediate zone of mean arc voltage in which the arc is stable and makes it possible to establish optimum working conditions.

If the above-mentioned experiments are repeated for various unwinding speeds there is determined as shown in the graph of FIGURE 2 the correct fusion zone. A containing all the points of operation for which the working conditions are satisfactory.

Once this correct fusion zone A is determined experimentally there is then selected for the apparatus in accordance with the present invention, a curve E lying completely within the correct fusion zone A. This curve E cuts at different points $e_4$, $e_5$, $e_6$, etc., the various straight lines giving the arc voltage as a function of the welding current intensity values which are constant but differ from the unwinding speed of wire V, that is to say the straight lines respectively $V_4$, $V_5$, $V_6$, etc., for which we have respectively $V=4$ (in metres per minute), $V=5$, $V=6$, etc.

Therefore, to each of the points of intersection $e_4$, $e_5$, $e_6$, etc., of the curve E with the straight lines $V_4$, $V_5$, $V_6$, etc., there corresponds a respective arc voltage $u_4$, $u_5$, $u_6$, etc. The curve E is then transposed into a law of dependence on the wire unwinding speed in relation to arc voltage, this law being given by the points $e_4$, $e_5$, $e_6$, etc. To the straight line E in the diagram in FIGURE 2 there corresponds therefore a straight line D in FIGURE 3 which represents the unwinding speed of wire V, in metres per minute, as a function of the arc voltage U in volts. The diagram of FIGURE 3 shows four other curves $D_1$, $D_2$, $D_3$ and $D_4$ given by way of example, the laws of dependence of which should follow the unwinding speed V as a function of voltage U for the respective wire diameters of 0.9 mm., 1.2 mm., 1.4 mm. and 1.6 mm. It can be seen from FIGURE 3 that the curves D1–D4 are substantially straight lines of the equation $V=aU+b$.

The potentiometer 18 in FIGURE 1 makes it possible to vary the slope of the straight lines, that is to say, the coefficient $a$, while the potentiometer 38 makes it possible to vary the term $b$.

To simplify the automatic regulation there is selected for each wire diameter the mean value of the correct fusion zone as defined by the curve A in FIG. 2.

Of course, the form of embodiment illustrated in the drawing and described hereinabove should not be construed as limiting the present invention as many modifications may be brought thereto without departing from the basic principle of the invention as set forth in the appended claims.

What I claim is:

1. Apparatus for shielded arc welding with a fusible electrode, said apparatus comprising welding means, a source of A.C. voltage coupled to said means, rectifying means coupled to said source to provide a welding arc voltage, drive means for driving said electrode through said welding means at a controllable rate of speed, there being a determinable speed at which the electrode is most effectively employed, actuation means coupled to said drive means for controlling the latter to drive said electrode through said welding means, a first variable control means coupled between said rectifying means and actuation means to provide a first control voltage which is related to the diameter of the electrode and to a function of the welding arc voltage, and a second variable control means coupled to said actuation means and adapted to provide a selected second control voltage which is related to said diameter and is substantially independent of said welding arc voltage and is substantially constant, said first and said second variable control means being constituted by switches comprising a plurality of taps corresponding to electrode diameters, said actuation means including means to apply a voltage corresponding to the difference between the control voltages to said drive means whereby the speed of said drive means will vary according to the welding arc voltage as modified by the substantially constant second control voltage.

2. Apparatus as claimed in claim 1 comprising fine adjustments coupled to said first variable control means.

3. Apparatus as claimed in claim 1, wherein said second variable control means is coupled to said source.

4. Apparatus as claimed in claim 1, comprising means for supplying gas to said welding means.

References Cited by the Examiner
UNITED STATES PATENTS

| | | | |
|---|---|---|---|
| 1,982,327 | 11/34 | Smith | 314—32 |
| 2,008,411 | 6/35 | Blankenbuehler et al. | 314—32 |
| 2,132,479 | 10/38 | Holslag | 314—64 |
| 2,145,010 | 1/39 | Kennedy et al. | 314—64 |
| 2,253,321 | 8/41 | Blankenbuehler | 314—73 |
| 2,259,958 | 10/41 | Levy | 314—64 |
| 2,441,406 | 4/48 | Freeman et al. | 214—135 |
| 2,491,319 | 12/49 | Kocher | 314—75 |
| 2,906,859 | 9/59 | Steele | 219—130 |
| 3,002,085 | 9/61 | Labosco et al. | 219—130 |

RICHARD M. WOOD, *Primary Examiner.*